United States Patent [19]

Satoh et al.

[11] 4,453,814
[45] Jun. 12, 1984

[54] DEVICE FOR RECORDING DATA ON FILM OF A CAMERA

[75] Inventors: Toshihiko Satoh, Kanagawa; Toshikazu Ichiyanagi, Tokyo, Japan

[73] Assignee: Canon Kabushiki Kaisha, Tokyo, Japan

[21] Appl. No.: 329,415

[22] Filed: Dec. 10, 1981

[30] Foreign Application Priority Data

Dec. 15, 1980 [JP] Japan .................. 55-176668

[51] Int. Cl.³ .............................. G03B 17/24
[52] U.S. Cl. .................................. 354/107
[58] Field of Search ............... 354/100, 105, 106, 107, 354/108, 109; 355/41, 40; 352/92, 236

[56] References Cited

U.S. PATENT DOCUMENTS

| 3,906,523 | 9/1975 | Ogiso et al. | 354/109 |
| 3,968,505 | 7/1976 | Kauneckas | 354/106 |
| 4,079,388 | 3/1978 | Takahama et al. | 354/105 |

Primary Examiner—A. A. Mathews
Attorney, Agent, or Firm—Toren, McGeady and Stanger

[57] ABSTRACT

In the disclosed camera, a data recording device detecting arrangement is set for detecting the spectrographic characteristics of image light at a data recording position on a film and a data recording light emitting arrangement is set for recording the data with a color whose spectrographic characteristics are different from that of the detected color.

9 Claims, 3 Drawing Figures

DEVICE FOR RECORDING DATA ON FILM OF A CAMERA

BACKGROUND OF THE INVENTION

1. Field of the Invention

The present invention relates to a camera data recording device for recording data such as a photographic date, file number, etc., on film while taking a picture.

2. Description of the Prior Art

In a conventional data recording device, a flash light device, a lamp or a light emitting diode, whose spectrographic characteristic is constant, is used as the data recording light source. Consequently, it often happens that the recorded data is hard or impossible to recognize depending upon the spectrographic characteristics or the color of the object on the data recording position. This is inconvenient.

SUMMARY OF THE INVENTION

An object of the present invention is to offer a data recording device whose recorded date is easy to recognize, and avoids the aforementioned shortcomings, In accordance with the present invention, a device serves for detecting the spectrographic characteristics of the light incident upon the data recording position on the film and a number of the light sources serve to emit lights of different wave lengths. While taking a picture, the light sources are made to emit light selectively in accordance with the color of the object detected by the detecting device so that the image of the data is recorded with a color different from that of the background.

DESCRIPTION OF THE PREFERRED EMBODIMENT

Figure 1:
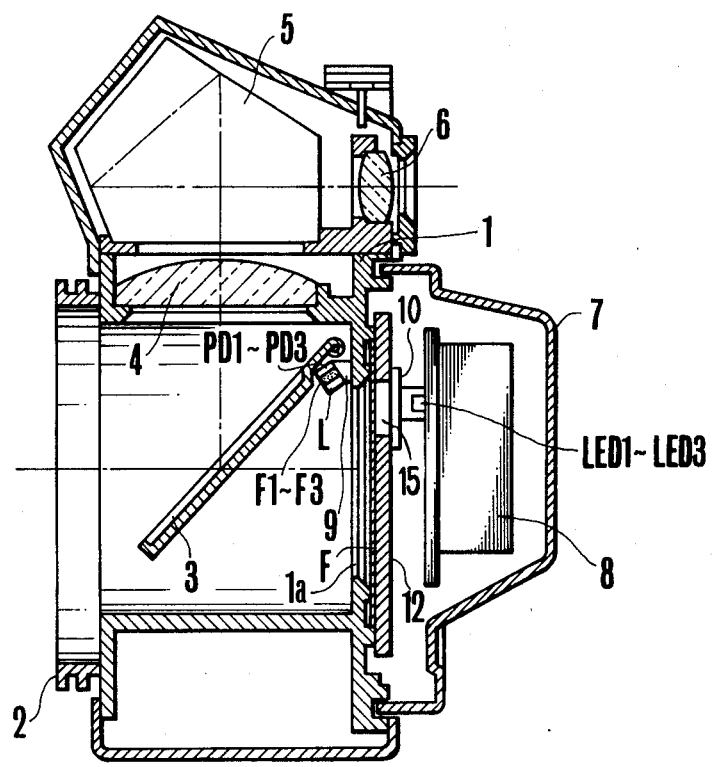
FIG. 1 shows a section through the single lens reflex camera containing a device in accordance with the present invention.

In FIG. 1, a camera body 1 has a lens mount 2 arranged in front thereof. A conventional quick return mirror 3, at the shown position, reflects the light from a photographic lens upwards toward a view finder and at the raised position allows passage of light from the photographic lens through the opening so as to form an image on the film F. Member 4 is a condenser lens, 5 is a pentagonal prism and 6 is a finder eye piece.

Figure 2:
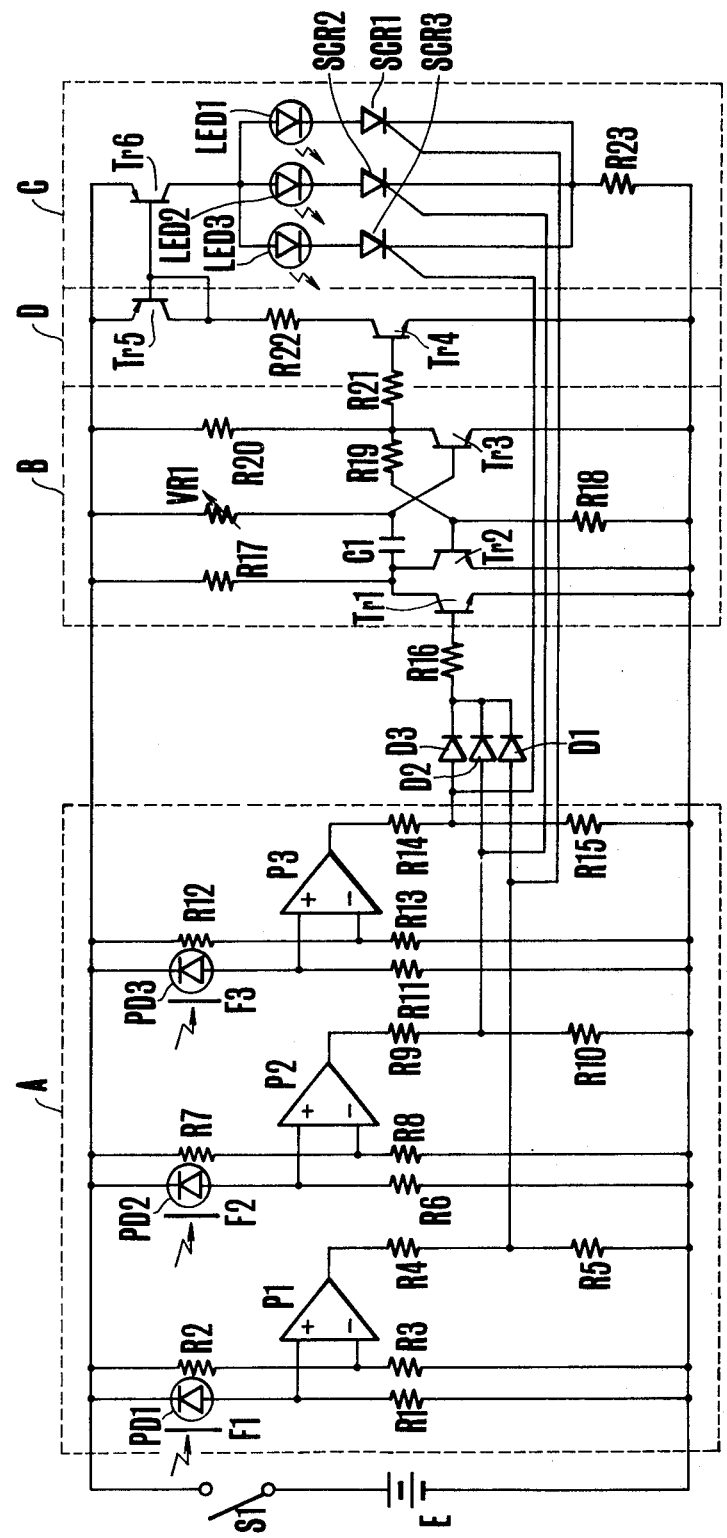
FIG. 2 shows the circuit diagram of an embodiment in accordance with the present invention.

A back cover 7 hinged on the camera body holds a data recording control device 8, in which an electric circuit shown in FIG. 2 is built, and a film press plate 12 in front of the device 8 by means of a spring not shown in the drawing. In front of the control device 8, three light emitting diodes LED1-LED3 emit different colors and are arranged close to each other, while the LEDs and a film press plate 12 have a data plate 10 with transparent data figures held between them so as to be operable from outside of the camera. The lights emitted from the LEDs and having passed the data figures on the data plate strikes the film F through the opening in the film press plate so as to record the data figures at a predetermined position on the picture.

The LED1 emits a red color, a LED2 a blue color and the LED3 the green color.

Between the (not shown) focal plane shutter in front of the opening 1a and the quick return mirror 3, a support member holds the three light sensing elements PD1-PD3 on the interval wall of the camera body. In front of each light sensing element, a condenser lens L is arranged to sense the light reflected from the data recording portion in front of the above opening 15.

In front of the element PD1 is a filter F1 allowing the passage of the red light, in front of the element PD2, a filter allowing the passage of the blue light and in front of the PD3, a filter allowing the passage of the green light.

FIG. 2 shows the control circuit for the data recording device.

In the drawing, a light sensing circuit A, a one shot multivibrator B and a light emitting circuit C for data recording are connected in parallel with the power source E. The light sensing circuit A is composed of several parallel connected light sensing elements PD1-PD3, a number of comparators P1-P3 receiving the output from the one terminal of each light sensing element PD1-PD3 and a number of resistors R1-R15, and in front of the light incident surface of each light sensing element PD1-PD3, are the above-mentioned filters F1-F3.

The one shot multivibrator B is composed of transistors Tr2 and Tr3, resistors R17-R20, a capacitor C1 and a variable resistor VR1 whose value is varied in accordance with the kind of films. The base of the transistor Tr1 connected in parallel with the above-mentioned transistor Tr2, receives the outputs of the above-mentioned comparator via the diodes D1-D3 and the resistor R16.

The light emitting circuit C is composed of several parallel connected sets, each including a light emitting element and a thyristor connected in series to each other. A transistor Tr6 is connected to the one terminal of each light emitting element LED1-LED3, the resistor R23 to one terminal of each thyristor SCR1-SCR3 and the outputs of the above-mentioned comparators P1-P3 are delivered to the gates of the respective thyristors SCR1-SCR3.

The above-mentioned one shot multivibrator B has a constant current circuit, to which the transistors Tr4 and Tr5 and the resistor R22 are connected in series, and connected parallel thereto, and the base of the transistor Tr5 is connected to that of the transistor Tr6 in such a manner that the output of the one shot multivibrator B is delivered to the base of the transistor Tr4 via resistor R21.

When, in the above-mentioned construction the figures on the data plate are selected by the (not shown) operation member and placed between the light emitting elements and the opening 15, a (not shown) shutter button is pressed, the quick return mirror 3 is raised and then the shutter is opened in a conventional manner. At this time, a power source switch S1 is closed in operative engagement with the shutter operation and power is supplied to the above-mentioned electrical circuits.

Of the object image formed on the film F by means of the (not shown) photographic lens, the light reflected on the data recording part is sensed by the light sensing elements PD1-PD3.

If an image with a red light is formed on the data recording part, only the element PD1 of the light sensing elements senses the light passing through the filter F1, while the lights incident upon other light sensing elements are cut with the filters F2 and F3, so that the comparator P1 delivers the output "0", while the comparators P2 and P3 deliver the output "1". Consequently with the output of the comparators P2 and P3, the thyristors SCR2 and SCR3 are switched on, while the thyristor SCR1 is switched off. Thus, the light emitting elements LED2 and LED3 emit blue light and green light respectively so as to illuminate the data plate and record the data figures on the film with a color different from the background of the picture.

As mentioned above, in accordance with the present invention, the spectrographic characteristics of the photographic light exposed to the data recording position on the film are detected so as to record the data with the color whose spectrographic characteristics are different from the detected one so that the recorded data is never confused with the object and easy to recognize (SN ratio good).

Further, in the embodiment shown constructing the device so that the value of the variable resistor VR1 in the one shot multivibrator B is varied in accordance with the kind of films used so as to determine the light emitting time of the light emitting elements for data recording, while delivering a constant current to the light emitting elements LED1-LED3 from the constant current circuit D, it is possible to record the data at a desired time and with a predetermined amount of light.

Figure 3:
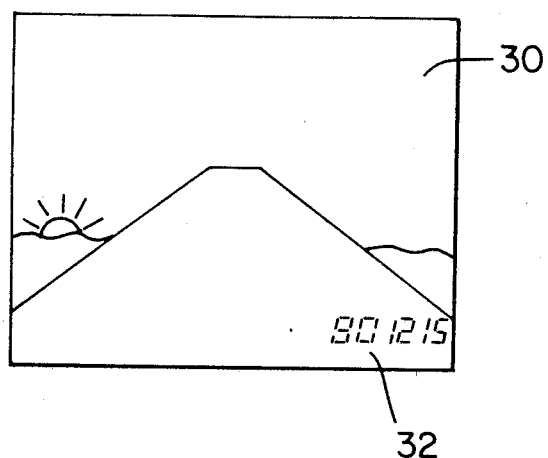
FIG. 3 is a view of an image with imprinted data figures.

FIG. 3 is a view of an image 30 with data figures 32.

What is claimed is:

1. A data recording device for a camera which forms an image on an image plane comprising:
    (a) a plurality of data light sources for emitting color lights differing from each other so as to record data figures on a predetermined portion of the image plane;
    (b) detecting means for detecting the spectrographic characteristics of the image formed at the predetermined portion of the image plane; and
    selecting means for causing the data light sources selectively to emit light on the basis of the detected spectrographic characteristics.

2. A device in accordance with claim 1, wherein the detecting means includes a plurality of filters, each of a different color, and a plurality of light sensing elements each for sensing the light passing through one of the filters.

3. A device in accordance with claim 1, wherein the data light source includes three light emitting diodes emitting red, blue and green lights, while the detecting means includes a light sensing element for sensing the red light, a light sensing element for sensing the blue light and a light sensing element for sensing the green light.

4. A device in accordance with claim 3, wherein the detecting means includes comparators each responsive to a light sensing element for causing the light emitting diodes to emit light selectively.

5. A data recording device for a camera that forms images comprising:
    (a) a data holder for holding data figures;
    (b) three light emitting bodies of different colors for illuminating the data on the holder; and
    (c) detecting means for detecting the color of a predetermined portion of an image formed so as to produce a signal; and
    selecting means responsive to the detecting means for causing the light emitting bodies selectiely to emit light in accordance with the output of the detecting means.

6. A device as in claims 1,2, 3, or 4, wherein said selecting means is arranged selectively to cause the light sources to emit light different from the spectrographic characteristics.

7. A device as in claim 5, wherein said selecting means is arranged to select for operation those of the bodies which emit colors different from the color of a predetermined portion of the image.

8. A device as in claim 6, wherein said selecting means is arranged to prevent the light sources from emitting light corresponding to the spectrographic characteristics.

9. A device as in claim 7, wherein said selecting means is arranged to prevent the body which normally emits a color corresponding to the color of the predetermined portion of the image from emitting light.

* * * * *